Figure 1:
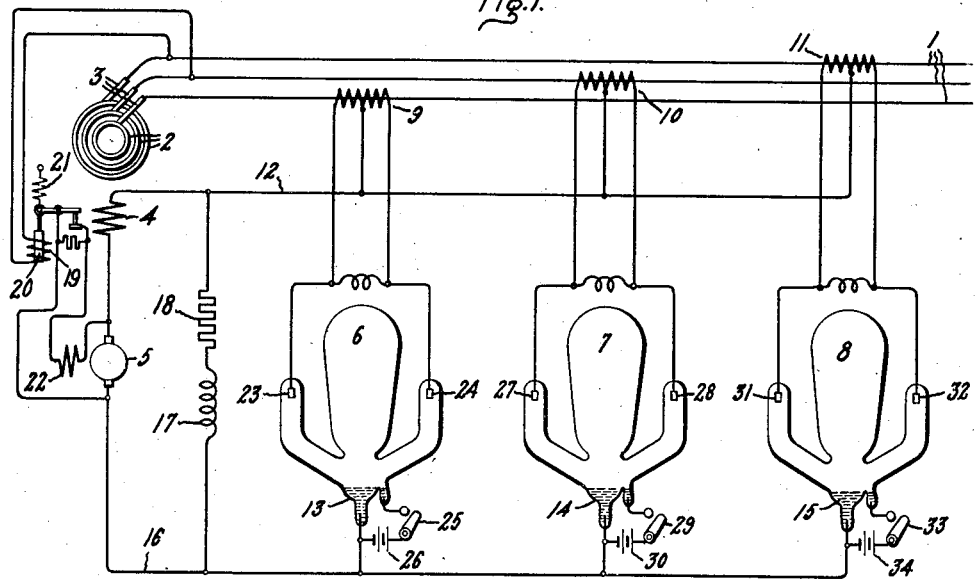

Feb. 22, 1927.

D. C. PRINCE 1,618,725

EXCITATION OF ALTERNATING CURRENT MACHINES

Filed May 2, 1925

Inventor:
David C. Prince,
by *[signature]*
His Attorney.

Patented Feb. 22, 1927.

1,618,725

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

EXCITATION OF ALTERNATING-CURRENT MACHINES.

Application filed May 2, 1925. Serial No. 27,599.

My invention relates to the excitation of alternating current machines, and has for its principal object the provision of improved regulating means whereby the voltage of an alternating current machine may be maintained substantially constant irrespective of variation in its load current. A further object is the provision of an improved arrangement for stabilizing the operation of synchronous machines interconnected through long transmission lines or other highly reactive circuits whereby the line may be operated closer to its maximum power limit.

It is well known that the terminal voltage of a synchronous generator is dependent on its field excitation and internal voltage drops; that these voltage drops vary with change in the generator load current; and that, in order to maintain the terminal voltage of the generator constant, the generator field excitation must be adjusted simultaneously and in accordance with changes in the current generated. Many of the arrangements proposed and utilized for regulating the excitation of synchronous machines in the past have involved the use of a regulator connected to the machine load circuit in a manner to vary the machine excitation in accordance with the load current, the regulator being arranged either to control the machine excitation directly or to control the voltage of the exciter from which the field current of the machine is supplied. In the operation of these and similar arrangements, changes in machine excitation are not produced simultaneously with changes in machine load current but occur some time thereafter, and difficulty is encountered due to the fact that the synchronizing force exerted between the synchronous machines is likely to be greatly weakened before the machine voltage has been restored to its normal value. This difficulty is especially pronounced in the case of long power transmission lines or other highly reactive circuits because variations in line voltage large enough to produce instability in the operation of synchronous apparatus interconnected with the system are likely to occur with changes in load. For this reason the maximum power that can be delivered over a long alternating current transmission line with a given impressed voltage is much lower than the power that the same generator capacity is capable of delivering over a short transmission line.

It has been determined that a 200,000 kilovolt-ampere generator capacity, for example, is capable of delivering only about 120,000 kilowatts at 220,000 volts over a line 250 miles long. If some method could be devised for changing the generator excitation rapidly enough to neutralize the effect of armature reaction, such a generator capacity would be capable of delivering about 190,000 kilowatts over a line 250 miles long. In accordance with my invention, the time interval between change in alternator load and excitation is greatly reduced through the use of a regulating arrangement for producing a generator excitation component that is proportional in value to the machine load current and changes at substantially the same instant as this current. By means of this arrangement, the maximum power that can be transmitted with stability over a transmission line 250 miles long can be increased in the ratio of 120 to 155 over that transmitted with the usual regulating arrangement.

My invention will be better understood from the following description when considered in connection with the accompanying drawing and its scope will be pointed out in the appended claims.

Figure 2:
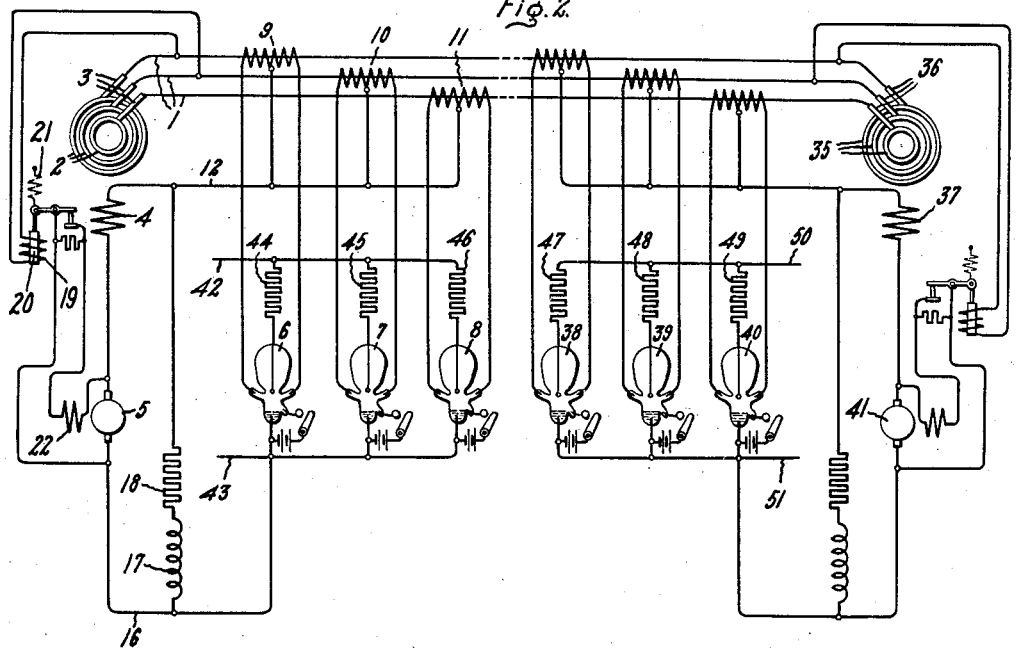

Referring to the drawing, Fig. 1 shows the generator end of a power transmission system wherein my invention has been embodied; and Fig. 2 shows further details of a transmission system arranged to be operated in accordance with my invention.

Fig. 1 shows a synchronous generator or alternator provided with an armature winding which is connected to a transmission line 1 through slip rings 2 and brushes 3 and with a field winding 4 which is arranged to have one component voltage applied to it by the exciting machine 5 and another component voltage applied to it by the parallel-connected rectifying or vapor electric devices 6, 7 and 8. It will be observed that devices 6, 7 and 8, which are shown as mercury rectifiers, are connected to the transmission line 1 through series transformers 9, 10 and 11 respectively; that the midpoint of each of these transformers is connected to one terminal of the alternator field circuit through a conductor 12; that the cathodes 13, 14 and 15 of the devices 6, 7 and 8 are connected to the other terminal of the alternator field winding 4 through conductor 16 and armature winding of exciter 5; and that reactor 17 and resistor 18 are connected to the operating circuits of the devices 6, 7 and 8 in shunt to the alternator field and exciter armature windings. While means shown as a regulator comprising an operating coil 19 and a core 20 biased to its illustrated position by a spring 21 have been provided for controlling the excitation of the exciter field winding 22 in accordance with the voltage of the line 1, it will be apparent that a regulator of any suitable type may be utilized for this purpose. The device 6 is provided with anodes 23 and 24 which are connected to opposite terminals of the current transformer 9 and with starting switch 25 and battery 26; the device 7 is provided with anodes 27 and 28 connected to opposite terminals of transformer 20 and with starting switch 29 and battery 30; and the device 8 is likewise provided with anodes 31 and 32 connected to opposite terminals of transformer 11 and with starting switch 33 and battery 34. An inductive shunt may be connected across the secondary leads of the transformers 9, 10 and 11 to minimize the energy losses produced in the resistance 18. The same result may be produced by an air gap in the core structures of these transformers.

Assuming the synchronous generator to be in operation and operation of the devices 6, 7 and 8 to have been initiated by means of starting switches 25, 29 and 33, the major part of the alternator excitation is supplied from the exciter 5 so long as the alternator load is light. As the alternator load increases in magnitude, however, the component of excitation supplied through the devices 6, 7 and 8 increases in magnitude. The regulator then functions to control the field current of the exciter 5 in a manner to complement the voltage impressed on the field circuit by the exciter thus maintaining the alternator voltage at its normal value. The alternator excitation thus comprises two components, one of which is supplied from the exciter 5 and tends to decrease as the alternator load increases and to lag somewhat behind the changes in alternator load current and the other of which is supplied through the devices 6, 7 and 8 and changes in value almost simultaneously with the variation in alternator load current. While but one field winding 4 has been shown it will be apparent that separate field circuits supplied with current from the exciter and rectifiers respectively may be used. The component of alternator excitation supplied through the devices 6, 7 and 8 not only changes at substantially the same instant as the alternator load current but also varies directly as this current and is the main factor in maintaining stable operation at heavy loads for the reason that it substantially neutralizes the effect of armature reaction. Where the alternator load is subject to sudden changes in value, the effect of the excitation component supplied through the devices 6, 7 and 8 is increased or amplified by the reactor 17 which transmits current of a value inversely proportional to the rate of current change.

Fig. 2 shows a synchronous motor provided with an armature winding connected to the line 1 through slip rings 35 and brushes 36 and with a field winding 37 arranged to be supplied with current through exciter 41 and devices 38, 39 and 40. The devices 6, 7 and 8 of Fig. 2 are shown as provided with exciting circuits which comprise resistors 44, 45 and 46 respectively and are arranged to be connected through leads 42 and 43 to a source of suitable potential. The devices 38, 39 and 40 are likewise shown as provided with exciting circuits which comprise resistors 47, 48 and 49 respectively and are arranged to be connected to a suitable source through leads 50 and 51. The arrangement and purpose of the other details shown in Fig. 2 will be readily understood in view of what has been said with respect of Fig. 1. With both the alternator and the synchronous motor excited by component field currents which respond substantially instantaneously to changes in load current, the synchronizing force exerted between the alternator and motor is maintained at a value that ensures stable operation of the system under heavy load conditions.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:

1. The combination of a synchronous machine comprising field and armature circuits, a polyphase transmission line connected to said armature circuit, an exciter connected to said field circuit for applying thereto a component voltage which varies inversely as the load current of said machine, and rectifying means connected in parallel between said field circuit and the different phases of said transmission line for applying to said field circuit a component voltage which varies directly as said load current and at substantially the same time.

2. The combination of a synchronous machine comprising field and armature circuits, a transmission line connected to said armature circuit, an exciter connected to said field circuit, means for adjusting the excitation of said exciter in response to variation in the voltage of said line, and vapor electric means interconnecting said line and said field circuit for applying to said field circuit a component voltage which varies directly as the load current of said generator and at substantially the same time.

3. The combination of a synchronous machine comprising field and armature circuits, a transmission line connected to said armature circuit, an exciter connected to said field circuit, means for adjusting the excitation of said exciter in response to variation in the voltage of said line, and rectifying means connected to said field circuit in series with said exciter and arranged to apply thereto a component voltage which varies directly as the load current of said machine and at substantially the same time.

4. The combination of a synchronous machine comprising field and armature circuits, a transmission line connected to said armature circuit, rectifying means interconnecting said field circuit and said line for applying to said field circuit voltage which varies directly as the load current of said generator and at substantially the same time, and means comprising a reactor connected between the direct current terminals of said rectifying means for amplifying said field voltage upon sudden changes in the value of said load current.

In witness whereof, I have hereunto set my hand this 1st day of May, 1925.

DAVID C. PRINCE.